US007323235B2

(12) United States Patent
Vaughn

(10) Patent No.: US 7,323,235 B2
(45) Date of Patent: Jan. 29, 2008

(54) MULTI-STRIP PROMOTIONAL PIECE

(75) Inventor: Shane Vaughn, Nashotah, WI (US)

(73) Assignee: Graham Group, Inc., Chesterfield, MO (US)

( * ) Notice: Subject to any disclaimer, the term of this patent is extended or adjusted under 35 U.S.C. 154(b) by 167 days.

(21) Appl. No.: 10/895,197

(22) Filed: Jul. 20, 2004

(65) Prior Publication Data

US 2006/0019049 A1 Jan. 26, 2006

(51) Int. Cl.

| | |
|---|---|
| ***B32B 9/00*** | (2006.01) |
| ***B32B 33/00*** | (2006.01) |
| ***B42D 15/00*** | (2006.01) |
| ***G09F 3/10*** | (2006.01) |
| ***G09F 23/00*** | (2006.01) |

(52) U.S. Cl. ...................... 428/40.1; 428/42.1; 283/56; 40/299.01; 40/637; 40/675

(58) Field of Classification Search ...... 428/41.7–42.3, 428/40.1; 283/56, 61, 62, 65; 40/675, 637, 40/299.01

See application file for complete search history.

(56) References Cited

U.S. PATENT DOCUMENTS

| | | | | |
|---|---|---|---|---|
| 1,849,774 | A | | 3/1932 | Taylor |
| 1,924,903 | A | | 8/1933 | Birdseye |
| 2,225,694 | A | | 12/1940 | Freeman |
| 2,255,810 | A | | 9/1941 | Replogle |
| 2,578,150 | A | | 12/1951 | Rathke |
| 2,596,514 | A | | 5/1952 | Uehlein |
| 2,911,305 | A | | 11/1959 | Rumsey, Jr. |
| 3,373,045 | A | | 3/1968 | Peterson |
| 4,747,619 | A | * | 5/1988 | Sager .......................... 462/67 |
| 4,775,154 | A | | 10/1988 | Clinnin et al. |
| 4,781,378 | A | | 11/1988 | Clinnin et al. |
| 4,817,990 | A | * | 4/1989 | Krost ......................... 283/101 |
| 4,837,956 | A | | 6/1989 | Dolence |
| 6,103,326 | A | * | 8/2000 | Kobayashi ................. 428/40.1 |
| 6,521,322 | B1 | * | 2/2003 | Bailey ........................ 428/192 |

* cited by examiner

*Primary Examiner*—Patricia L Nordmeyer
*Assistant Examiner*—Rena Dye
(74) *Attorney, Agent, or Firm*—Polsinelli Shalton Flanigan Suelthaus PC

(57) ABSTRACT

The present invention is an multi-strip promotional piece that can be used as an insert for a food product package and that includes a number of printed strips releasably secured to one another by an adhesive. The strips each include an inner polymeric film layer printed on one or both sides and having an outer polymeric film layer secured over one of the sides of the inner polymeric film layer. The first polymeric film layer is releasably securable to a first polymeric film layer of the adjacent strip such that the inks printed on the first film layers of the strips are kept in a sealed configuration within the insert while the strips are secured to one another within the package.

25 Claims, 1 Drawing Sheet

MULTI-STRIP PROMOTIONAL PIECE

FIELD OF THE INVENTION

The present invention relates to printed labels or promotional pieces that are usually inserted in packages containing food products for use as coupons or other advertising materials.

BACKGROUND AND SUMMARY OF THE INVENTION

In the packaging and marketing of a variety of food products, such as bakery goods, cheeses, meats, and cereals, difficulty has been experienced in the insertion of various promotional pieces such as coupons, recipes, collection cards, or other types of printed inserts. Numerous problems are presented when food oils contact the printing ink. As a result, the Food & Drug Administration allows only a small number of vegetable-based inks to be used in materials that are in direct contact with food. This limits the scope of applications for promotional pieces because the food product must be protected from ink or odor contamination coming from the promotional piece even in situations where the vegetable-based inks are used. Further, the promotional piece must be protected as well from absorbing moisture or grease from the product. This is because a printed promotional piece that is soiled has the potential of imparting contamination to the product. Also, a printed promotional piece that is stained, particularly a collection card, is counterproductive to the original purpose of the promotion.

In the past, most promotional pieces were printed on paper or paperboard. The only way to overcome the ink contamination problem with these types of pieces was to over-wrap the pieces. This entails placing the piece or insert in a bag of a transparent plastic, such as cellophane, and sealing it. Unfortunately over-wrapping presented some major problems:

1. Over-wrapping is costly, in many cases doubling the cost of the promotion.

2. The contract packaging company who does the over-wrapping dictates the schedule.

3. Machines that insert the pieces into the package were not made for over-wrapped pieces, and results of this mismatch include a large waste factor due to dispenser malfunction because of the over-wrap, pillowing, hang-ups on the back seal, and static build-up causing mis-feeds.

To overcome these problems, there was an attempt at developing another type of piece which was constructed of printed paper with a polypropylene film laminated to it. This achieved the desired savings in cost by eliminating the over-wrap and protecting the food from ink contact, but this structure has very poor product resistance. In most applications, the moisture from oils and food products seeped into the paper, causing stains and actually delaminating the insert. The result was a very unattractive promotion piece that exposed the inks and adhesive to the food products. This problem is known as wicking and has the potential to occur in most products where promotional pieces or inserts are used. Examples of some of the prior art arrangements discussed herein are illustrated and described in U.S. Pat. Nos. 1,849,774, 1,924,903, 2,225,694, 2,255,810, 2,578,150, 2,596,514, 2,911,305, and 3,373,045.

Another insert construction that has been developed to be utilized as a promotional piece or in-pack insert is illustrated and described in U.S. Pat. No. 4,837,956, which is incorporated herein by reference. In this insert construction, a plastic film laminate insert is disclosed in which a core layer of polymeric film is printed on one or both sides with a desired message. The ink on each side of the core layer is coated with an adhesive over which is applied a transparent and grease-resistant polymeric film that encloses and seals the printing ink against any potential contaminants, such as a grease, oil or other moisture which may emanate from the food product.

Due to the monolithic construction of this insert, the insert is limited to a single insert or coupon structure. Because a large number of products have the capability of accepting inserts of this type, it is desirable to provide more than one insert on many occasions. However, as it is unwieldy to place multiple inserts in a single package for various reasons, it is desirable to develop an insert that has the capability of forming multiple inserts in a single structure.

SUMMARY OF THE INVENTION

The present invention provides a plastic film laminate promotional piece that can be inserted within food packages which carries a number of printed advertising messages. The film laminate seals the printing ink forming the message against contact with grease, oil, or other moisture which might emanate from the food product. The piece or insert includes a number of separable labels or strips that are releasably joined together by a central layer of an adhesive. The central adhesive layer enables the strips to be held together in a single structure until they are manually pulled apart to form a pair of inserts.

Each strip is formed of an inner layer of suitable polymeric film that is printed on one or both sides with a message to be displayed and then coated on one side opposite the central adhesive layer with an outer layer of adhesive. An outer layer of a transparent, grease-resistant, polymeric film is secured to the outer adhesive layer on each strip to form a top and bottom protective layer for the insert and effectively seal the ink on the inner layers from contact with oil, grease or other moisture from the food product when the strips are secured to one another to form the insert.

Numerous additional aspects, features and advantages of the present invention will be made apparent from the following detailed description taken together with the drawing figures.

BRIEF DESCRIPTION OF THE DRAWINGS

The drawings illustrate the best mode currently contemplated of practicing the present invention.

In the drawings.

DETAILED DESCRIPTION

Figure 1:
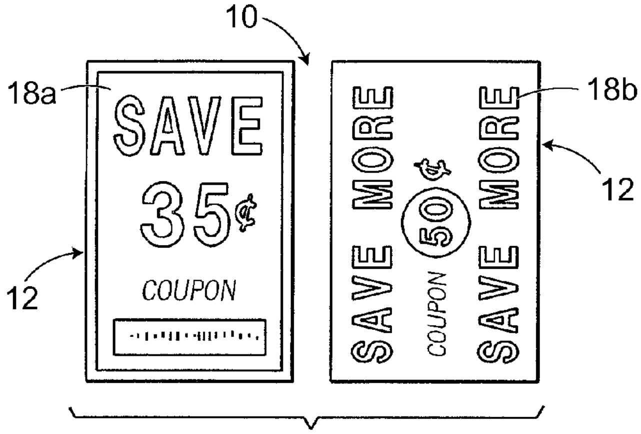
FIG. 1 is a top plan view of the separated strips of the multi-strip promotional piece of the present invention.
Figure 2:
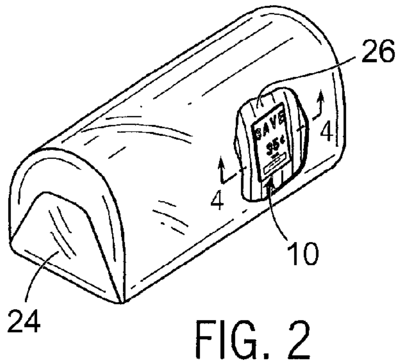
FIG. 2 is an isometric view, partially broken away, showing the piece displayed inside the outer packaging wrapper for a food product.

With reference now to the drawing figures in which like reference numerals represent like parts throughout the disclosure, a multi-strip promotional piece or package insert constructed according to the present invention is illustrated generally at 10 in FIGS. 1-4. The message-carrying insert 10 is constructed using specific materials so as to form an insert or a coupon which can be readily inserted into a package 24 containing a food product 26 without any interaction between the inks forming the message on the insert 10 and the food product 26.

Figure 3:
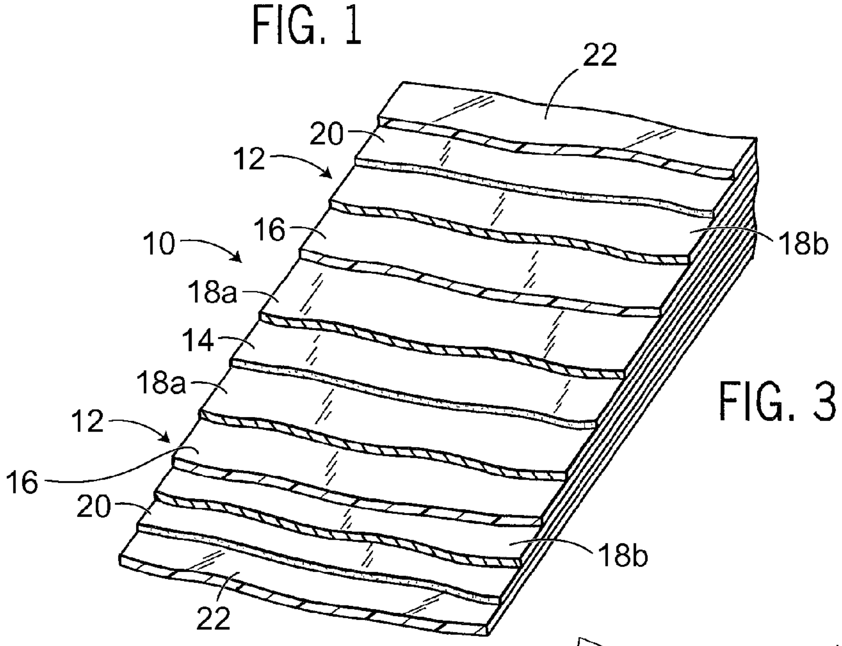
FIG. 3 is a partially broken away isometric view of the piece.
Figure 4:
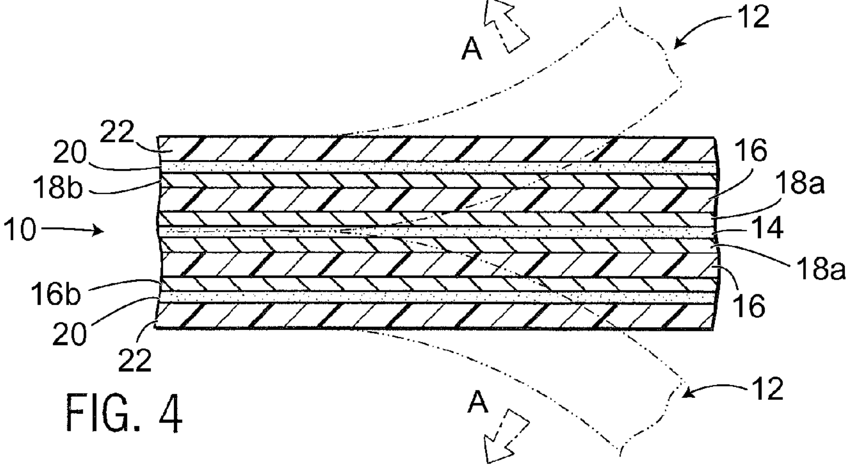
FIG. 4 is a cross-sectional view along line 4-4 of FIG. 2.

As best illustrated in FIGS. 3 and 4, the insert 10 consists of a plastic film laminate comprised of a plurality of layers. Although, technically, the printing ink disclosed herein is not actually a layer, it is illustrated as such in FIGS. 3 and 4 simply for purposes of explanation. This illustration approach has been used in the past and should provide no confusion to one of ordinary skill in the art.

The insert 10 includes a pair of pieces or strips 12 that are secured to one another to form the insert 10 by a central adhesive layer 14 disposed between the strips 12. The adhesive forming the layer 14 is any conventional low tack adhesive capable of securely holding the strips 12 in engagement with one another until such time as the insert 10 is removed from the package 24 and it is desired to separate the strips 12 from one another. A particularly preferred adhesive for use in forming the layer 14 is the low tack adhesive sold by Northwest Coatings, LLC, of Oak Creek, Wis.

Each strip 12 is formed of an inner polymeric film layer 16, a pair of printing layers 18*a* and 18*b* disposed on opposite sides of the inner layer 16, an outer adhesive layer 20 disposed over the printing layer 18*b,* and an outer polymeric film layer 22 secured to the adhesive layer 20 over the printing layer 18*b*.

The inner polymeric film layer 16 of each strip 12 can be any suitable polymer film, but normally comprises a biaxially oriented polymeric film. In the preferred embodiment, this layer is an opaque polystyrene, but any biaxially oriented polymeric film that can receive printing inks may be used. The opacity is helpful when dual side printing is used in order to prevent the opposite printed side from being viewed through the film layer 16. Transparent films could also be utilized as the layer 16, particularly if one-side printing is used. However, polystyrene is also preferred because of its ability to produce high quality graphics when printed, offering a variety of printing capabilities.

The relative thickness of the layers 16-22 of the strips 12 of the insert 10 of this invention may, of course, vary within the limits which will be recognized by those skilled in the art. In the preferred embodiment discussed herein, which has been successfully made and tested, the inner polymeric film layer 16 was formed of a 2.5 mil, white, biaxially oriented polystyrene film sold by Plastic Suppliers of Chicago Heights, Ill. However, the thickness of the film used to form the layer 16 can be varied between about 1.5-mils and about 3 mils, as desired.

This inner layer 16 is then printed on one or both sides, as illustrated at 18*a* and 18*b,* with an advertising, promotional or other message. The methods of printing which have been found suitable include rotogravure printing and flexographic process printing. Other printing techniques may also be utilized. The variety of inks which may also be used is wide in scope since the net effect of the construction on the insert 10 of the present invention is to seal the insert 10 such that no contact is allowed between the inks and the food product. As a result, both water-based and solvent-based inks, in addition to other types of inks, can be utilized because the construction of the insert 10 prevents the inks from contacting and contaminating the food item. Preferred inks to be used in forming the layers 18*a* and 18*b* are sold by ColorCon of West Point, Pa. and by Interactive Inks and Coatings of St. Charles, Ill.

The layers of printing 18*b* on each strip 12 are then coated on their exterior surface by layers of adhesive, illustrated in FIGS. 3 and 4 as outer adhesive layers 20. This is preferably accomplished during an in-line adhesive lamination process. However, other methods, such as hand laminators, may also be used. Adhesives which have been found to be acceptable in forming the layers 20 of the insert 10 of the present invention can be applied separately to the layers 18*b* or 22, but are preferably pre-adhered to the layer 22, such as in the product No. 410 sold by ACPO of Oak Harbor, Ohio.

Next, polymeric film outer layers 22 are laminated to the outer adhesive layers 20 opposite the printing layers 18*b*. The polymeric outer film layers 22 are formed from any of a variety of preferably transparent, and grease-resistant, biaxially oriented polymeric films, and preferably a biaxially oriented polypropylene such as product No. 410 sold by ACPO. Use of the biaxially oriented polypropylene provides a clear protective covering for the ink layer 18*b* on the inner layer 16. However, the choice for the film used as the transparent, outer layer 22 of grease-resistant, biaxially oriented polymeric film is generally dictated by the desired characteristics of the finished insert 10. For example, depending on the need for stiffness and thickness of the insert 10, a transparent, grease-resistant, biaxially oriented polystyrene may be used for the outer layers 22. The reason for this is that the use of polystyrene for these layers 22 substantially stiffens the insert 10. This would be advantageous to advertisers or promoters who would like to duplicate the stiffness of presently used paperboard in collection cards and game pieces.

The outer layers 22 of the grease-resistant film provide an effective barrier between the ink layer 18*b* and any grease, oil or other moisture from the food product. Also, because the layers 22 are positioned on each side of the finished insert 10, the barrier provided by these layers 22 is maintained until the insert 10 is removed from the package 24 and the strips 12 are separated from one another by pulling the strips 12 in the direction indicated by arrows A in FIG. 4. The outer layers 22 can vary in thickness depending on the use and construction of the finished insert 10. In general, acceptable thicknesses of the outer film layers 22 range between 0.5 mil and 4 mils in thickness.

However, a particularly preferred thickness for these layers 22 is between 1.0 and 2.0 mils, with a layer 22 of 1.1 mil thickness being most preferred.

After each of the strips 12 is formed by adhering the outer film layer 22 to the inner film layer 16 using the adhesive layer 20, each of the inner layers 16 of the respective strips 12 can be secured to one another by the central adhesive layer 14 to form the insert 10. The process of depositing the adhesive layer 14 on one or both of the strips 12 can be done in any conventional manner whereby the strips 12 are subsequently contacted after application of the layer 14 to enable the adhesive layer 14 to secure the strips 12 to one another. After the strips 12 have been secured to form the insert 10, the insert 10 can be cut or scored to from easily separable inserts 10 of any desired shape to form the particular size or design insert 10 desired. In a particularly preferred embodiment, the insert 10 is cut and scored to form inserts 10 with a generally rectangular shape of approximately 3×2 inches that can be separated from one another along the scores. After formation into the desired shape, the inserts 10 can then be positioned within the packaging 24 for the particular food item 26 either by hand or mechanically.

Thus, it has been shown that the message-carrying insert 10 of the present invention includes a pair of plastic film laminate strips 12 which each contain an advertising message printed on one or both sides of the strip 12 that will not be exposed to moisture or oils in the food product 26 with which it is intimately associated. The insert 10 does not need to be over-wrapped or protected in any exterior way to be successfully used. It can also be put into the packages 24 by currently known placing machines (not shown), thereby efficiently eliminating the large waste factors which are typical of other prior art embodiments. The inserts 10 of the present invention are available in a wide range of finished thicknesses to accommodate a large variety of promotional opportunities including coupons, collection cards, games, etc.

The method of manufacture of this insert 10 creates a plastic film laminate that is clean and crisp looking when removed from the food product package 24. When used with food products 26 such as meat and cheese, the insert 10 can be rinsed and wiped clean of any grease or oil that has come from the food product 26.

In alternative embodiments, it is possible to secure the inner layer 16 and outer layer 22 to one another without the use of the adhesive 20, such as by means of heat bonding the layers 16 and 22 directly to one another. Further, the number of strips 12 that can be releasably affixed to one another to form the insert 10 can be more than two, so long as the adhesive or other means used to secure the additional strips 12 to one another does not delaminate the outer film layers 22 from the printed layers 18*b* that they cover while securely holding the inner film layers 16 to the adjacent outer film layers 22. Additionally, the insert 10 can be utilized without a package 24 as a stand-alone promotional piece. In this application, the construction of the insert 10 enables the insert 10 to be used in a variety of different situations due to its moisture-resistant properties.

Various alternatives to the present invention are contemplated as being within the following claims particularly pointing out and distinctly claiming the subject matter regarded as the present invention.

I claim:

1. A multi-piece package insert for food packages comprising:

a) a continuous central adhesive layer; and b) at least two printed strips completely releasably secured to one another on opposite sides of the central adhesive layer to form the multipurpose package insert for food packages, wherein the at least two printed strips are pulled apart at the central adhesive layer to form at least two separate printed strips, wherein each of the at least two printed strips comprises an inner polymeric film layer and a grease-resistant outer polymeric film layer secured to the inner polymeric layer, wherein at least one of the printed strips comprise at least one printed layer disposed on the inner polymeric film layer opposite of the outer polymeric film layer, wherein the central adhesive releasably secures to the at least one printed layer of one of the printed strips.

2. The insert of claim 1 wherein the outer film layer is secured to the inner layer over the at least one printed layer.

3. The insert of claim 2 further comprising a securing means disposed between the at least one printed layer and the outer film layer.

4. The insert of claim 3 wherein the securing means is formed from an adhesive.

5. The insert of claim 1 wherein the at least one printed layer comprises:

a) a first printed layer located on the inner film layer opposite the outer film layer; and b) a second printed layer located on the inner film layer adjacent the outer film layer.

6. The insert of claim 1 wherein the at least one printed layer is formed from inks selected from the group consisting of solvent-based inks and water-based inks.

7. The insert of claim 1 wherein the inner polymeric film layer is a biaxially oriented polymeric film layer.

8. The insert of claim 7 wherein the inner polymeric film layer is a biaxially oriented polystyrene layer.

9. The insert of claim 8 wherein the inner polymeric film layer is an opaque, biaxially oriented polystyrene layer.

10. The insert of claim 1 wherein the outer polymeric film layer is a grease-resistant, biaxially oriented polymeric film layer.

11. The insert of claim 10 wherein the outer polymeric film layer is a grease-resistant, biaxially oriented polystyrene film layer.

12. The insert of claim 10 wherein the outer polymeric film layer is a transparent, grease-resistant, biaxially oriented polymeric film layer.

13. The insert of claim 12 wherein the outer polymeric film layer is a transparent, grease-resistant, biaxially oriented polypropylene layer.

14. A method for forming a multi-piece package insert for food packages, the method comprising:

a) providing an inner layer of a polymeric film;

b) printing at least one printed layer on an inner surface of the inner film layer;

c) securing a grease-resistant outer layer of a polymeric film to an outer surface of the inner film layer to form a first strip;

d) applying a continuous central adhesive layer to the at least one printed layer of the inner film layer opposite the outer film layer; and e) adhering the inner layer of the first strip to an inner layer of a second strip via the continuous central adhesive, wherein the second strip further comprises a grease-resistant outer layer of a polymeric film.

15. The method of claim 14 wherein the step of printing the at least one printed layer on the inner film layer comprises:

a) printing a first printed layer on one side of the inner film layer; and b) printing a second printed layer on the other side of the inner film layer.

16. The method of claim 14 further comprising the step of forming the first strip, second strip and central adhesive layer into the desired shape after adhering the first strip to the second strip.

17. The method of claim 16 wherein the step of forming the first strip, second strip and central adhesive layer comprises cutting the first strip, second strip and central adhesive layer.

18. The method of claim 14 further comprising the step of securing a third strip formed similarly to the first and second strips, to one of the first or second strips after adhering the first strip to the second strip.

19. A stand-alone promotional piece for food packaging comprising:

a) a continuous central adhesive layer; and b) a pair of printed strips releasably secured to one another on opposite sides of the central adhesive layer to form the stand-alone promotional piece for food packaging, wherein each of the printed strips comprises an inner polymeric film layer, a first printed layer located on one side of the inner film layer, a second printed layer located on the other side of the inner film layer, and a grease-resistant outer polymeric film secured to the inner layer over the second printed layer to seal the second printed layer, wherein the pair of printed strips are pulled apart at the central adhesive layer to form a pair of separate printed strips.

20. The piece of claim 19 wherein the outer film layer is formed of propylene and the inner layer is formed of polystyrene.

21. A multi-piece package insert for food packages comprising:

a) a continuous central adhesive layer; and b) at least two printed strips releasably secured to one another on opposite sides of the central adhesive layer to form the multipurpose package insert for food packages; wherein the at least two printed strips are pulled apart at the central adhesive layer to form at least two separate printed strips; wherein each of the at least two printed strips comprises an inner polymeric film layer, wherein each inner polymeric film layer comprise an inner surface and outer surface, and a grease-resistant outer polymeric film layer secured to the outer surface of the inner polymeric film layer; wherein at least one of the inner surfaces of the inner polymeric film layers comprise printing; wherein the central adhesive releasably secures to the inner surfaces of the inner polymeric film layer to form the multi-piece package insert.

22. A multi-piece package insert for food packages comprising:

a) a first printed strip comprising a first inner polymeric film layer, and a grease-resistant, first outer polymeric film layer secured to an outer surface of the first inner polymeric layer opposite of an inner surface of the first inner polymeric film layer, b) a second printed strip comprising a second inner polymeric film layer, and a grease-resistant, second outer polymeric film layer secured to an outer surface of the second inner polymeric film layer opposite of an inner surface of the of the second inner polymeric film layer;

c) at least one of the inner surfaces of the first and second inner polymeric film layers comprises printing; and d) a central adhesive layer comprising a low tack adhesive releasably securing to the inner surfaces of the first and second inner polymeric film layers.

23. A multi-piece package insert for food packages comprising:

a) a first printed strip comprising a first inner polymeric film layer, and a grease-resistant, first outer polymeric film layer secured to an outer surface of the first inner polymeric film layer opposite of an inner surface of the first inner polymeric film layer;

b) a second printed strip comprising a second inner polymeric film layer, and a grease-resistant, second outer polymeric film layer secured to an outer surface of the second inner, polymeric film layer opposite of an inner surface of the of the second inner polymeric film layer;

c) a central adhesive layer of a low tack adhesive releasable securing to the inner surfaces of the first and second inner polymeric film layers to form the multi-piece package insert;

d) wherein the first and second outer polymeric film layers form a top and a bottom protective layer for the multi-piece package insert that seals the printing of the multi-piece package insert from contact with grease, oil or other moisture; and e) wherein the first and second printed strips are pulled apart at the central adhesive layer to the separate the first and second printed strips.

24. A multi-piece package insert for food packages comprising:

a) a central adhesive layer comprising a low tack adhesive; and b) at least two printed strips completely releasably secured to one another on opposite sides of the central adhesive layer to form the multipurpose package insert for food packages, wherein the at least two printed strips are pulled apart at the central adhesive layer to form at least two separate printed strips, wherein each of the at least two printed strips comprises an inner polymeric film layer and a grease-resistant outer polymeric film layer secured to the inner polymeric layer, wherein at least one of the printed strips comprise at least one printed layer disposed on the inner polymeric film layer opposite of the outer polymeric film layer, wherein the central adhesive releasably secures to the at least one printed layer of one of the printed strips.

25. A method for forming a multi-piece package insert for food packages, the method comprising:

a) providing an inner layer of a polymeric film;

b) printing at least one printed layer on an inner surface of the inner film layer;

c) securing a first outer layer of a grease-resistant polymeric film to an outer surface of the inner film layer to form a first strip;

d) applying a central adhesive layer of a low tack adhesive to the at least one printed layer of the inner film layer opposite the outer film layer; and e) adhering the inner layer of the first strip to an inner layer of a second strip via the continuous central adhesive, wherein the second strip comprises a second outer layer of a grease-resistant polymeric film.

* * * * *